(12) United States Patent
Wang

(10) Patent No.: US 9,395,476 B2
(45) Date of Patent: Jul. 19, 2016

(54) ADVANCED INFRARED CUT-OFF OPTICAL FILTERS

(75) Inventor: Jinwei Wang, Zhejiang (CN)

(73) Assignee: ZHEJIANG CRYSTAL OPTOELECTRONIC TECHNOLOGY CO., LTD., Taizhou (CN)

( * ) Notice: Subject to any disclaimer, the term of this patent is extended or adjusted under 35 U.S.C. 154(b) by 910 days.

(21) Appl. No.: 13/549,346

(22) Filed: Jul. 13, 2012

(65) Prior Publication Data

US 2013/0021515 A1 Jan. 24, 2013

(51) Int. Cl.
G02B 5/28 (2006.01)
C03C 17/34 (2006.01)

(52) U.S. Cl.
CPC ............ *G02B 5/282* (2013.01); *C03C 17/3417* (2013.01); *G02B 5/285* (2013.01)

(58) Field of Classification Search
None
See application file for complete search history.

(56) References Cited

U.S. PATENT DOCUMENTS

| | | | |
|---|---|---|---|
| 4,865,405 A * | 9/1989 | Kageyama | 359/359 |
| 5,644,124 A * | 7/1997 | Hamada et al. | 250/216 |
| 6,844,976 B1 * | 1/2005 | Firon et al. | 359/586 |
| 7,164,535 B2 * | 1/2007 | Hall | G02B 5/285 359/581 |
| 7,212,336 B2 * | 5/2007 | Chen et al | 359/359 |
| 7,215,466 B2 * | 5/2007 | Chen et al. | 359/359 |
| 7,450,306 B2 * | 11/2008 | Chen | 359/588 |
| 2005/0068456 A1 * | 3/2005 | Ohta et al. | 348/360 |
| 2005/0180010 A1 * | 8/2005 | Mukaiyama et al. | 359/497 |
| 2008/0100910 A1 * | 5/2008 | Kim et al. | 359/356 |
| 2008/0258043 A1 * | 10/2008 | Suzuki et al. | 250/208.1 |
| 2010/0321770 A1 * | 12/2010 | Pyo | G02B 5/22 359/359 |
| 2012/0075510 A1 * | 3/2012 | Sato et al. | 348/273 |
| 2012/0099188 A1 * | 4/2012 | Akozbek et al. | 359/360 |
| 2012/0145901 A1 * | 6/2012 | Kakiuchi | G02B 5/208 250/330 |
| 2014/0139912 A1 * | 5/2014 | Osawa et al. | 359/359 |

* cited by examiner

Primary Examiner — Derek S Chapel
(74) Attorney, Agent, or Firm — Anova Law Group, PLLC

(57) ABSTRACT

An infrared cut-off optical filter includes a substrate and a film structure. The substrate has a thickness and allows incoming lights to enter the optical filter at an incidence angle. The film structure is formed on the substrate to reduce an angle dependence of the optical filter with respect to the incoming lights. Further, the film structure contains a plurality of first type thin films with a first refractive index and a plurality of second type thin films with a second refractive index; the first type thin films and the second type thin films are arranged alternately; and thickness of individual films of the first type thin films and the second type thin films are controlled individually such that a substantial number of the first type thin films and the second type thin films have different thickness.

6 Claims, 4 Drawing Sheets

ADVANCED INFRARED CUT-OFF OPTICAL FILTERS

CROSS-REFERENCES TO RELATED APPLICATIONS

This application claims the priority of Chinese patent application no. 201120260797.0, filed on Jul. 22, 2011, the entire contents of all of which are incorporated herein by reference.

FIELD OF THE INVENTION

The present invention relates to the field of optical filter technology and, more particularly, relates to techniques for designing and fabricating high-performance infrared cut-off optical filters.

BACKGROUND

Photographic technology has been in rapid development in recent decades. The progresses are mainly reflected in: (1) digital technology is used in cameras, and (2) the requirement of large field of view on cameras brings wide-angle and ultra wide-angle lens into reality. However, to successfully apply digital technology in cameras, the Moire fringes caused by using CCD or CMOS image sensors and the thermal fluctuation caused by infrared light need to be suppressed. Thus, an infrared cut-off filter needs to be installed before the CCD or CMOS in the digital camera.

As to the wide-angle lens, the general requirement for a good quality camera is a field of view greater than 60°. That is, the optical lens not only needs to capture images with the normal incident light, but also needs to capture images with oblique incident light at an angle as large as 30°. However, wave optics theory has proved: the oblique incident light can produce polarization and lead to change in the refractive index and reflectivity of the optical lens. In general, if the incident light angle changes within 5°, the change in the refractive index and reflectivity may be small. But if the incident light angle changes beyond 5°, the change in the refractive index and reflectivity may be dramatic. If the field of view of the camera is 60°, then the change in the refractive index or reflectivity may be more than 35%, or even reaches 50%~85%, which can cause change in the photographic image clarity and serious distortion on the color of the image.

In order to reduce the changes on the refractive index of the lens caused by changes of the incidence angles, two mechanisms are currently used. One is to use blue glass and resin to make the optical lens. However, the blue glass is often costly and has few standard substrate thickness; the blue glass substrate is often in short supply; and the resin coating process is generally more complex, etc.

The other mechanism is to place an infrared (IR) film on the surface of the lens. The IR film is formed by stacking standard film layers, which may be easy to make. However, when lights enter at different incidence angles, the refractive index at 600-700 nm red wavelength range also changes. The low image clarity and uneven color can still exist, and only low-resolution optical imaging systems still use this type of IR film.

The disclosed methods and systems are directed to solve one or more problems set forth above and other problems.

BRIEF SUMMARY OF THE DISCLOSURE

One aspect of the present disclosure includes an infrared cut-off optical filter. The infrared cut-off optical filter includes a substrate and a film structure. The substrate has a thickness and allows incoming lights to enter the optical filter at an incidence angle. The film structure is formed on the substrate to reduce an angle dependence of the optical filter with respect to the incoming lights. Further, the film structure contains a plurality of first type thin films with a first refractive index and a plurality of second type thin films with a second refractive index; the first type thin films and the second type thin films are arranged alternately; and thickness of individual films of the first type thin films and the second type thin films are controlled individually such that a substantial number of the first type thin films and the second type thin films have different thickness.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
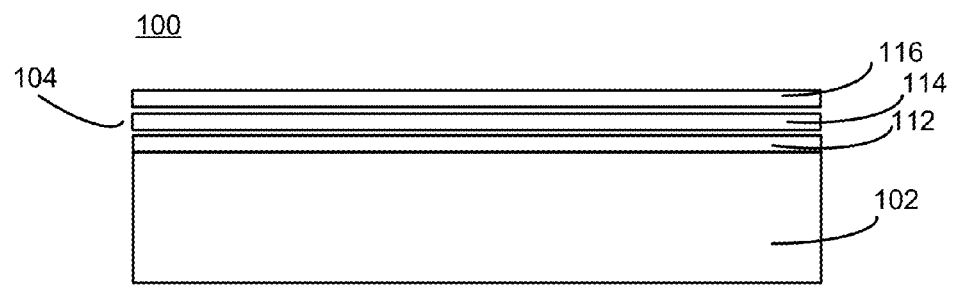
FIG. 1 illustrates an exemplary infrared cut-off optical filter consistent with the disclosed embodiments.

FIG. 1 illustrates an exemplary infrared cut-off optical filter 100 consistent with the disclosed embodiments. As shown in FIG. 1, optical filter 100 includes a substrate 102 and a filter film structure 104. Substrate 102 may include any appropriate material that can allow lights to pass through substrate 102. That is, filter substrate 102 has no special requirements on particular material, as long as visible light can pass through to the filter substrate 102. For example, filter substrate 102 may be an optical white flat glass or Schott D263Teco material.

The filter substrate 102 may have no special requirements on a particular thickness. Rather, the thickness of the filter substrate 102 may be in a certain range such that the refraction effect of the filter substrate 102 does not vary beyond a predetermined limit when the thickness varies within the certain range.

The filter film structure 104 may include a plurality of individual films, such as film 112, film 114, and film 116, etc. The number of the individual films may be determined according to a particular film structure design. The filter film structure 104 (i.e., the plurality of individual films) may be formed using a vacuum coating method, e.g., using a vacuum deposition chamber to deposit individual films on the optical substrate 102. Before forming the filter film structure 104, the surface of the filter substrate 102 is cleaned such that the coating process can be performed on the surface of the filter substrate 102.

The plurality of individual films are designed to reduce angle dependence of the optical filter 100. The term angle dependence, as used herein, may refer to the degree of changes on the spectral characteristics of the optical filter when the incidence angle of incoming lights of the optical filter changes. An optical filter with a small angle dependence, i.e., the spectral characteristics changes less when the incidence angle changes, may have desired image clarity and color evenness.

To realize a desired angle dependence, the plurality of individual films of the optical filter 100 may comprise a certain number of a first type of films with high refractive index and a certain number of a second type of films low refractive index, and the first type films and the second type films are formed alternately to form the filter film structure 104.

More particularly, the first type of films may include high-refractive-index material Ti3O5 or Ta2O5, and the second type of films may include low-refractive-index material SiO2. Other materials may also be used. Further, the high-refractive-index films and the low-refractive-index films are formed alternately and irregularly. That is, the filter film structure 104 may be formed by stacking the high-refractive-index films and the low-refractive-index films alternately, i.e., one layer of low-refractive-index film followed by one layer of high-refractive-index film or one layer of high-refractive-index film followed by one layer of low-refractive-index film, and with irregular thickness. The structure of the filter film structure 104 may be in the format of "$a_1L b_1 H a_2 L b_2 H \ldots a_i L b_i H$", where 'i' is the number of the combined film layer of a low-refractive-index film ($a_i L$) and a high-refractive-index film ($b_i H$), 'a' stands for the first type, 'L' stands for low-refractive-index film, 'b' stands for the second type, and 'H' stands for low-refractive-index film. Table 1 below shows an exemplary filter film structure.

TABLE 1

Film Structure of the Optical filter

| Layer | Material | Thickness (nm) |
|---|---|---|
| 1 | L | 96.65 |
| 2 | H | 8.34 |
| 3 | L | 37.46 |
| 4 | H | 100.18 |
| 5 | L | 173.24 |
| 6 | H | 34.34 |

TABLE 1-continued

Film Structure of the Optical filter

| Layer | Material | Thickness (nm) |
|---|---|---|
| 7 | L | 23.45 |
| 8 | H | 22.78 |
| 9 | L | 178.72 |
| 10 | H | 11.6 |
| 11 | L | 188.85 |
| 12 | H | 89.09 |
| 13 | L | 143.45 |
| 14 | H | 84.29 |
| 15 | L | 140.84 |
| 16 | H | 94.54 |
| 17 | L | 57.37 |
| 18 | H | 18.86 |
| 19 | L | 25.59 |
| 20 | H | 75.51 |
| 21 | L | 190.52 |
| 22 | H | 20.32 |
| 23 | L | 216.63 |
| 24 | H | 19.67 |
| 25 | L | 192.56 |
| 26 | H | 77.52 |
| 27 | L | 31.35 |
| 28 | H | 14.65 |
| 29 | L | 71.21 |
| 30 | H | 116.93 |
| 31 | L | 28.01 |
| 32 | H | 129.34 |
| 33 | L | 19.86 |
| 34 | H | 133.36 |
| 35 | L | 18.37 |
| 36 | H | 133.21 |
| 37 | L | 18.21 |
| 38 | H | 131.04 |
| 39 | L | 19.35 |
| 40 | H | 134.52 |
| 41 | L | 20.35 |
| 42 | H | 118.05 |
| 43 | L | 19.35 |
| 44 | H | 90.08 |
| 45 | L | 85.67 |

The structure of the filter film structure 104 may also be in the format of "$a_1 H b_1 L a_2 H b_2 L \ldots a_i H b_i L$", where 'i' is the number of the combined film layer of a high-refractive-index film ($a_i H$) and a low-refractive-index film ($b_i L$), 'a' stands for the first type, 'H' stands for high-refractive-index film, 'b' stands for the second type, and 'L' stands for low-refractive-index film. Table 2 below shows an exemplary filter film structure.

TABLE 2

Film Structure of the Optical filter

| Layer | Material | Thickness (nm) |
|---|---|---|
| 1 | H | 89.57 |
| 2 | L | 37.46 |
| 3 | H | 100.18 |
| 4 | L | 173.24 |
| 5 | H | 34.34 |
| 6 | L | 23.45 |
| 7 | H | 22.78 |
| 8 | L | 178.72 |
| 9 | H | 11.6 |
| 10 | L | 188.85 |
| 11 | H | 89.09 |
| 12 | L | 143.45 |
| 13 | H | 84.29 |
| 14 | L | 140.84 |
| 15 | H | 94.54 |

TABLE 2-continued

Film Structure of the Optical filter

| Layer | Material | Thickness (nm) |
|---|---|---|
| 16 | L | 57.37 |
| 17 | H | 15-30 |
| 18 | L | 25.59 |
| 19 | H | 75.51 |
| 20 | L | 190.52 |
| 21 | H | 15-30 |
| 22 | L | 216.63 |
| 23 | H | 15-30 |
| 24 | L | 192.56 |
| 25 | H | 77.52 |
| 26 | L | 31.35 |
| 27 | H | 15-30 |
| 28 | L | 71.21 |
| 29 | H | 116.93 |
| 30 | L | 15-30 |
| 31 | H | 129.34 |
| 32 | L | 15-30 |
| 33 | H | 131.4 |
| 34 | L | 15-30 |
| 35 | H | 132.24 |
| 36 | L | 15-30 |
| 37 | H | 132.14 |
| 38 | L | 15-30 |
| 39 | H | 132.48 |
| 40 | L | 15-30 |
| 41 | H | 132.77 |
| 42 | L | 15-30 |
| 43 | H | 133.36 |
| 44 | L | 15-30 |
| 45 | H | 133.21 |
| 46 | L | 15-30 |

TABLE 2-continued

Film Structure of the Optical filter

| Layer | Material | Thickness (nm) |
|---|---|---|
| 47 | H | 131.04 |
| 48 | L | 15-30 |
| 49 | H | 113.09 |
| 50 | L | 162.26 |
| 51 | H | 89.79 |

Figure 2:
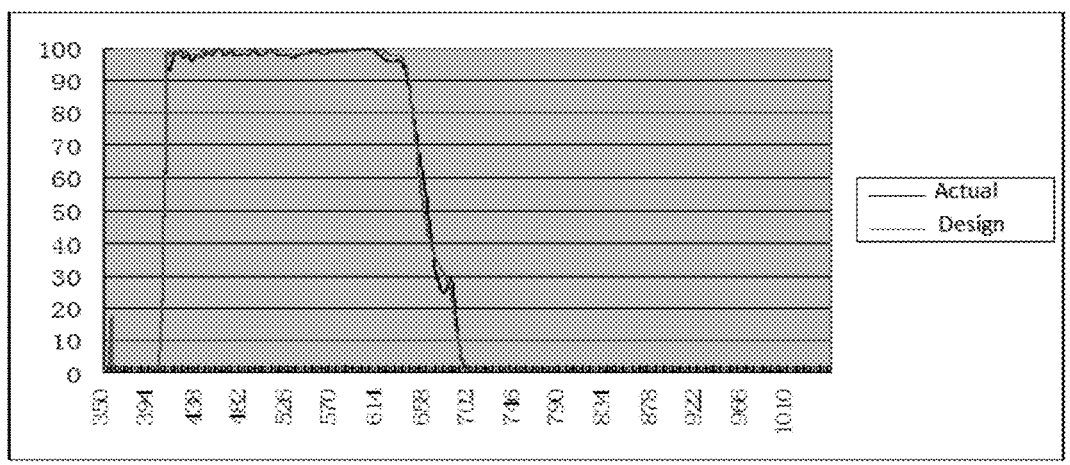
FIG. 2 illustrate spectral curves of an actual film structure and a film structure design with respect to coating precision consistent with the disclosed embodiments.

In Table 1 and Table 2, the high-refractive-index film may be formed using $T_iO_2$ or $Ta_2O_5$, and the low-refractive-index film may be formed using $S_iO_2$, or $MgF_2$. The individual films may be formed by using vacuum coating equipment. The thickness of individual films of the high-refractive-index films and the low-refractive-index films are controlled individually such that a substantial number of the high-refractive-index films and the low-refractive-index films have different thickness. However, for irregular individual films (e.g., film layers with bold font), the vacuum coating equipment, such as HOM2-R-VIS400 optical film thickness meter, may be unable to accurately monitor the thickness of the films, causing deformation of the coating curve with respect to the design curve of the spectral characteristics. FIG. 2 shows such deformation, when the 6-8 layers of films are coated with a thickness of 3 nm less, the actual coating spectral curve and the design spectral curve may differ at certain locations.

Thus, the coating thickness of individual films is controlled by optical monitoring and/or control combined with crystal oscillation monitoring and/or control to ensure accurate film thickness. For example, Japanese OPTORUN's OTFC series coating machine high-precision optical control and crystal oscillation control system may be used to control the coating thickness of each film layer such that the coating curve and the design curve can match.

After the film structure 104 is formed using the above-described materials, structures, and methods, the pass-through rate change for 600-700 nm red-light spectral band with an incidence angle of 0-30 degrees can then be controlled to be less than 20%. The pass-through rate change may be calculated as (initial pass-through rate—final pass-through rate)/initial pass-through rate. Table 2 shows a comparison of average pass-through rate changes of the optical filter 100 and a conventional IR filter.

TABLE 3

Comparison of Average Pass-through Rate Changes

| | | Degree | | | | | | | |
|---|---|---|---|---|---|---|---|---|---|
| Rate | | 0-5 | 0-10 | 0-15 | 0-20 | 0-25 | 0-30 | 0-35 | 0-40 |
| 600-700 nm Average rate change | Optical Filter 100 | 0.59% | 2.36% | 5.24% | 9.15% | 14.02% | 19.88% | 27.33% | 37.55% |
| | IR filter | 1.54% | 6.12% | 13.64% | 23.92% | 36.73% | 51.68% | 68.34% | 81.93% |

As shown in Table 3, the average pass-through rate changes for 600-700 nm spectral band with a variety of incidence angle ranges for both the optical filter 100 and the conventional IR filter are calculated and compared. The incidence angle ranges include 0-5, 0-10, 0-15, 0-20, 0-25, 0-30, 0-35, and 0-40 degrees. Other angle ranges can also be used. For example, the pass-through rate change for 600-700 nm red-light spectral band with an incidence angle of 0-30 degrees is 19.88% (less than 20%).

Figure 3A:
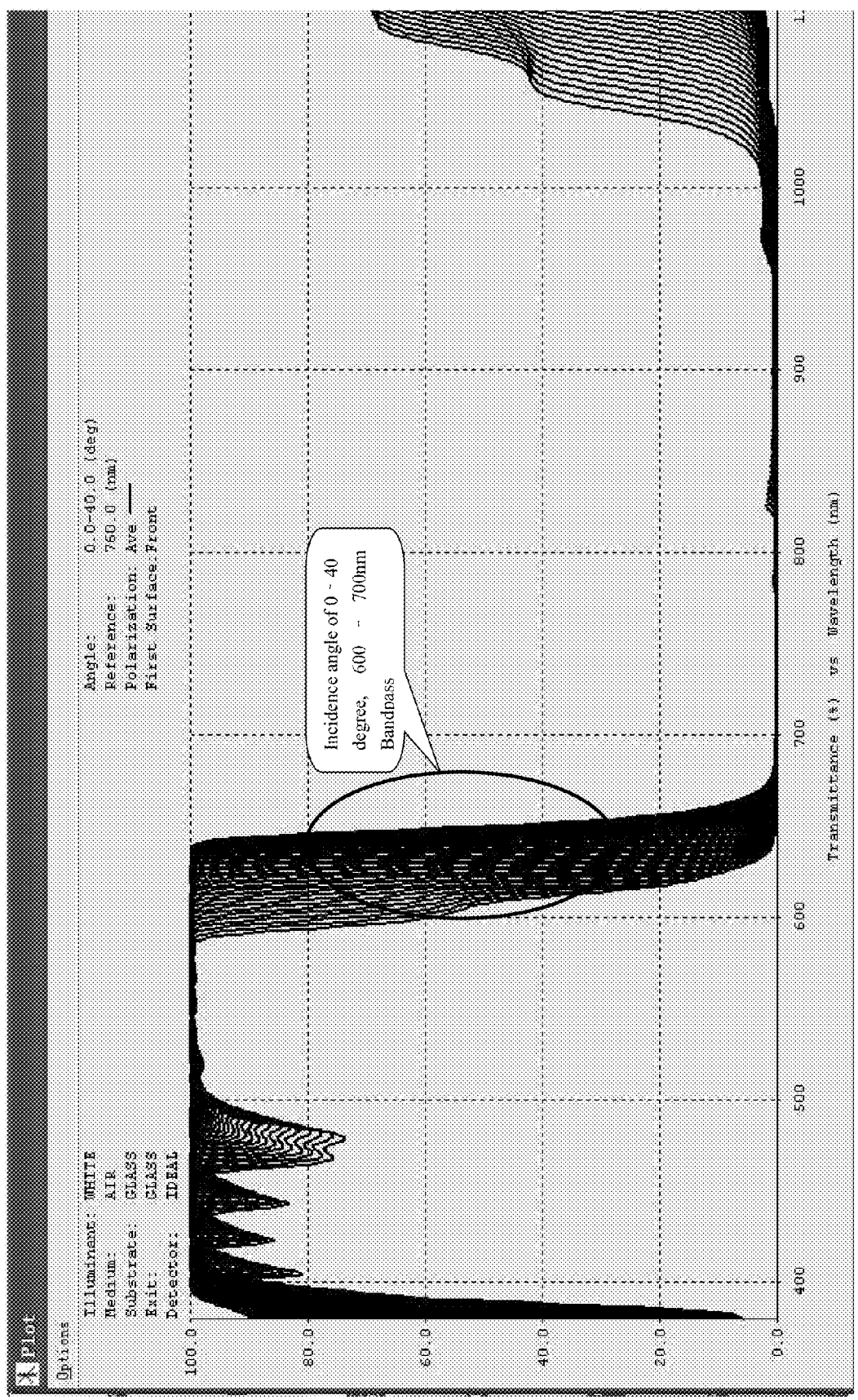
FIG. 3A shows pass-through rate changes for the conventional IR filter.
Figure 3B:
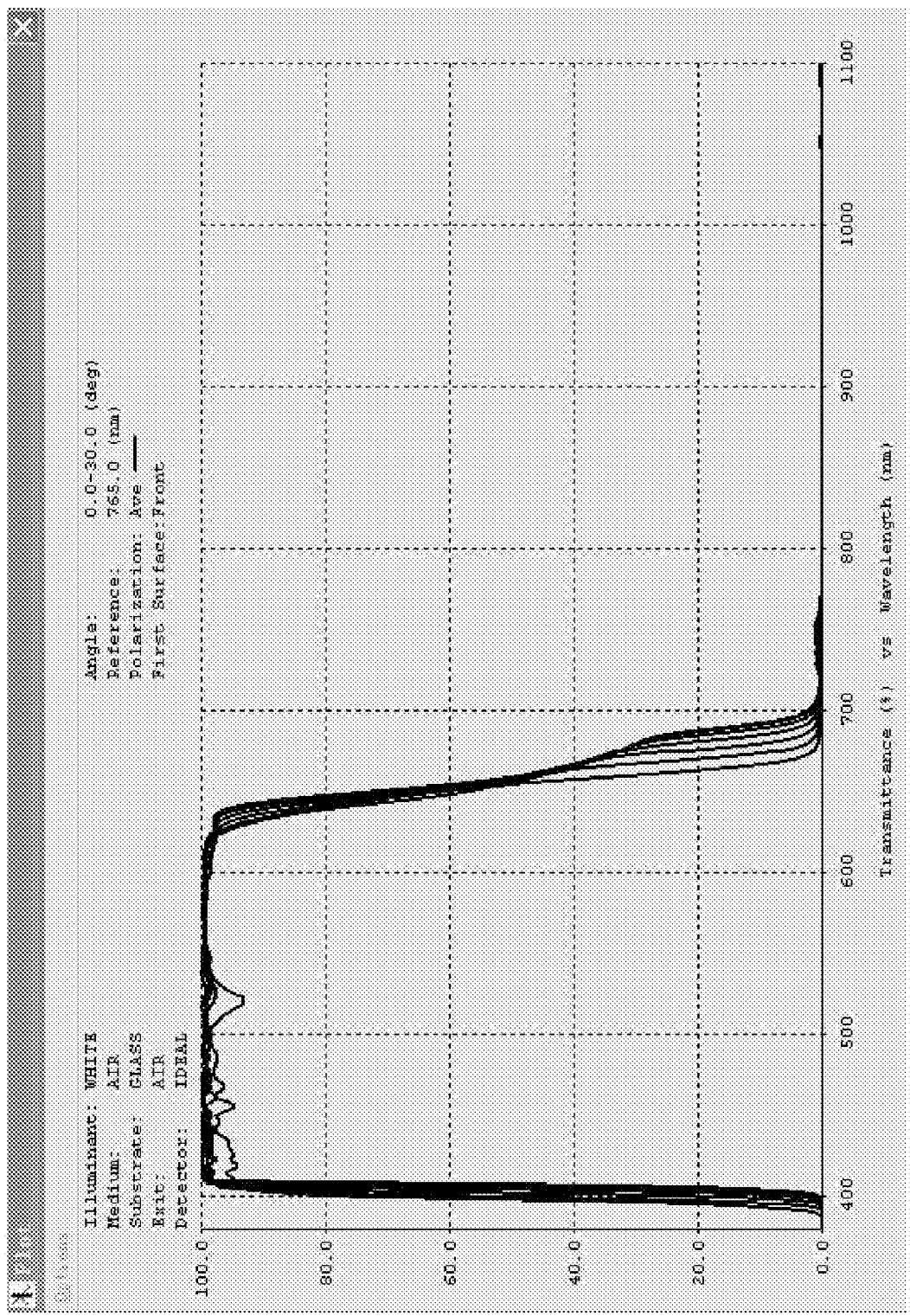
FIG. 3B illustrate pass-through rate changes for an exemplary infrared cut-off optical filter consistent with the disclosed embodiments.
Figure 3C:
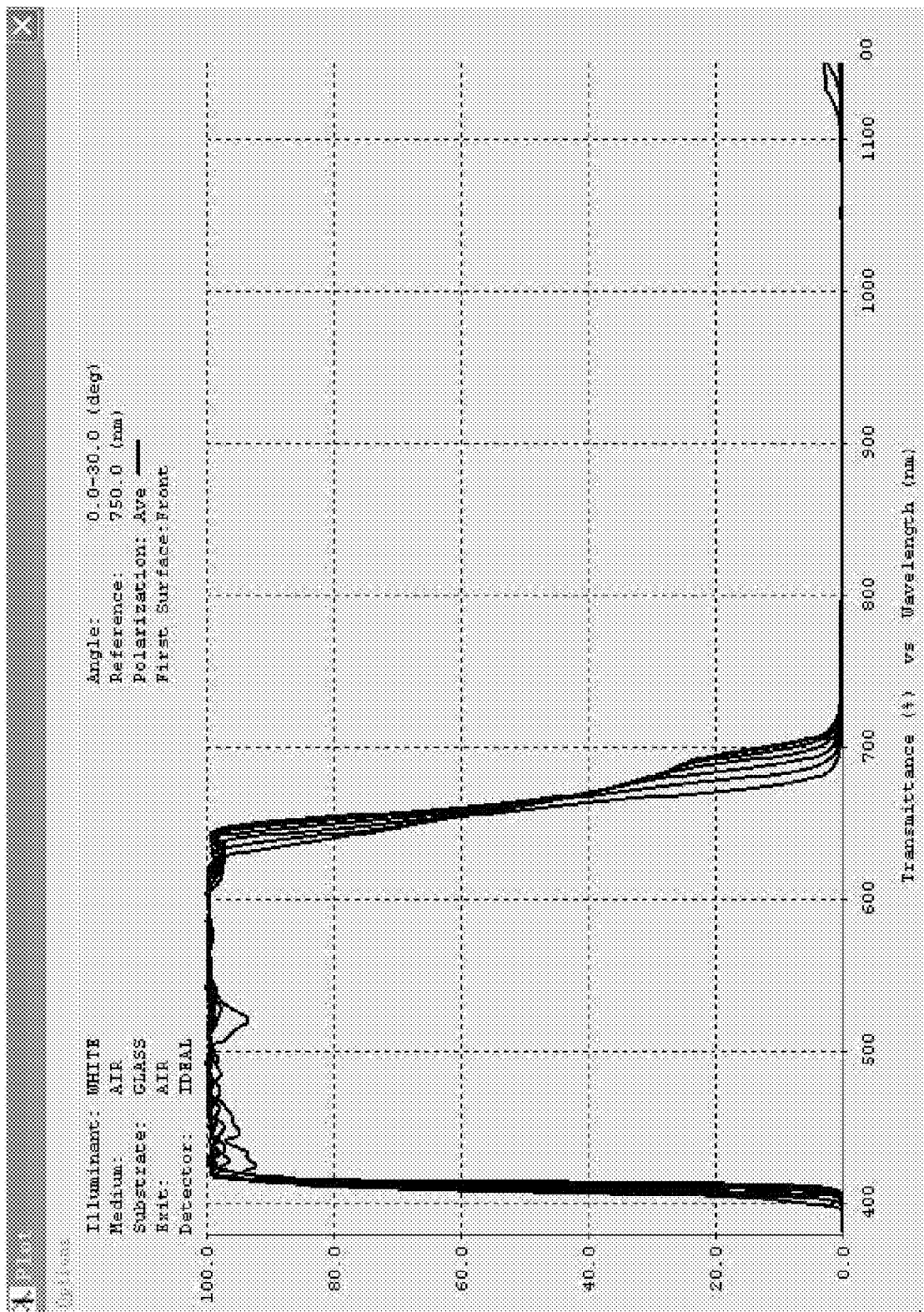
FIG. 3C illustrate pass-through rate changes for another exemplary infrared cut-off optical filter consistent with the disclosed embodiments.

Further, FIG. 3A shows pass-through rate changes for the conventional IR filter for the spectral band of 600-700 nm with incidence angle of 0-40 degrees. FIG. 3B shows pass-through rate changes for the optical filter 100 with an "$a_1Lb_1Ha_2Lb_2H \ldots a_iLb_iH$" formation for the spectral band of 600-700 nm with an incidence angle of 0-40 degrees. FIG. 3C shows pass-through rate changes for the optical filter 100 with an "$a_1Hb_1La_2Hb_2L \ldots a_iHb_iL$" formation for the spectral band of 600-700 nm with an incidence angle of 0-40 degrees. The pass-through rate changes for the optical filter 100 is substantially smaller than that of the conventional IR filter. Thus, the angle dependence of the optical filter 100 is more desired when comparing with the conventional IR filters.

The disclosed infrared cut-off optical filters can be used in various optical imaging systems. Such filters not only can effectively suppress the ripple disturbance by the pass-through of light waves that are beyond the spatial frequency of the CCD or CMOS image sensor and suppress the infrared light, but also can successfully eliminate the color unevenness caused by the conventional IR filters.

By using the disclosed infrared cut-off optical filters between the optical lens and CCD or CMOS image sensor of an imaging apparatus, the effective resolution and color reproduction of color CCD and CMOS image sensors can be significantly improved, making the images clear and stable. That is, for an imaging apparatus, such as digital camera or video camera, having an optical lens and imaging sensors (e.g., CCD, CMOS) coupled to the optical lens to convert images captured by the optical lens into digital images, the infrared cut-off optical filter can be placed between the optical lens and the imaging sensor to substantially increase image clarity and color evenness of the digital images.

Further, using the disclosed infrared cut-off optical filters to replace the existing absorption-type blue glass, and without any special requirements on the thickness of the substrate, the volume of the lens can be controlled to allow the development of miniaturizing digital cameras. At the same time, the disclosed infrared cut-off optical filters can adapt the internal space in the lens for installation to improve the easiness of digital camera manufacturing. The disclosed infrared cut-off optical filters may be made at a cost of only one-tenth of the cost of the existing blue glass, greatly saving the manufacturing costs of the corresponding equipment.

Other applications, advantages, alternations, modifications, or equivalents to the disclosed embodiments are obvious to those skilled in the art.

What is claimed is:

1. An infrared cut-off optical filter, comprising:
a substrate having a thickness and allowing incoming lights to enter the optical filter at an incidence angle;
a film structure formed on the substrate to reduce an angle dependence of the optical filter with respect to the incoming lights, wherein:
the film structure contains a plurality of first type thin films with a first refractive index and a plurality of second type thin films with a second refractive index;
the first type thin films and the second type thin films are arranged alternately; and
thickness of individual films of the first type thin films and the second type thin films are controlled individually such that a substantial number of the first type thin films and the second type thin films have different thickness,
wherein the film structure is formed in a format of "a1Hb1La2Hb2L . . . a(i−1)Hb(i−1)LaiH", provided that 'i' is a number of film layer, 'a' stands for the first type, 'H' stands for high-refractive-index film, 'b' stands for the second type, and 'L' stands for low-refractive-index film,
a pass-through rate change for 600-700 nm red-light spectral band over an entire incident angle range of 0-30 degrees of the optical filter is less than 20%, and
the pass-through rate change is calculated as (initial pass-through rate−final pass-through rate)/initial pass-through rate, the initial pass-through rate is light transmission at 0 degree incident angle, and the final pass-through rate is light transmission at an incident angle larger than 0 degree but equal to or smaller than 30 degrees,
wherein a total number of the first type thin films and the second type thin films is greater than about 40.

2. The optical filter according to claim 1, wherein:
the first type thin film is made of $TiO_2$; and
the second type thin film is made of $SiO_2$.

3. The optical filter according to claim 1, wherein:
the substrate is made of an optical white flat glass or Schott D263Teco material.

4. The optical filter according to claim 1, wherein:
the individual films of the first type thin films and the second type thin films are formed by vacuum coating; and
the thickness of individual films of the first type thin films and the second type thin films are controlled by optical monitoring and crystal oscillation control.

5. An imaging apparatus containing the optical filter according to claim 1, comprising:
an optical lens to capture images of a target; and
an imaging sensor coupled to the optical lens to convert the captured image into digital images, wherein:
the optical filter is placed between the optical lens and the imaging sensor such that image clarity and color evenness of the digital images are substantially increased.

6. The optical filter according to claim 1, wherein:
the film structure is

| Layer | Material | Thickness (nm) | Layer | Material | Thickness (nm) | Layer | Material | Thickness (nm) |
|---|---|---|---|---|---|---|---|---|
| 1 | H | 89.57 | 18 | L | 25.59 | 35 | H | 132.24 |
| 2 | L | 37.46 | 19 | H | 75.51 | 36 | L | 15-30 |
| 3 | H | 100.18 | 20 | L | 190.52 | 37 | H | 132.14 |
| 4 | L | 173.24 | 21 | H | 15-30 | 38 | L | 15-30 |
| 5 | H | 34.34 | 22 | L | 216.63 | 39 | H | 132.48 |
| 6 | L | 23.45 | 23 | H | 15-30 | 40 | L | 15-30 |
| 7 | H | 22.78 | 24 | L | 192.56 | 41 | H | 132.77 |
| 8 | L | 178.72 | 25 | H | 77.52 | 42 | L | 15-30 |
| 9 | H | 11.6 | 26 | L | 31.35 | 43 | H | 133.36 |
| 10 | L | 188.85 | 27 | H | 15-30 | 44 | L | 15-30 |
| 11 | H | 89.09 | 28 | L | 71.21 | 45 | H | 133.21 |
| 12 | L | 143.45 | 29 | H | 116.93 | 46 | L | 15-30 |
| 13 | H | 84.29 | 30 | L | 15-30 | 47 | H | 131.04 |
| 14 | L | 140.84 | 31 | H | 129.34 | 48 | L | 15-30 |

-continued

| Layer | Material | Thickness (nm) | Layer | Material | Thickness (nm) | Layer | Material | Thickness (nm) |
|---|---|---|---|---|---|---|---|---|
| 15 | H | 94.54 | 32 | L | 15-30 | 49 | H | 113.09 |
| 16 | L | 57.37 | 33 | H | 131.4 | 50 | L | 162.26 |
| 17 | H | 15-30 | 34 | L | 15-30 | 51 | H | 89.79 | the high-refractive-index film is made of $TiO_2$, and the low-refractive-index film is made of $SiO_2$.

* * * * *